(12) United States Patent
Batarseh

(10) Patent No.: US 11,187,068 B2
(45) Date of Patent: Nov. 30, 2021

(54) DOWNHOLE TOOLS FOR CONTROLLED FRACTURE INITIATION AND STIMULATION

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 19 days.

(21) Appl. No.: 16/264,139

(22) Filed: Jan. 31, 2019

(65) Prior Publication Data

US 2020/0248543 A1    Aug. 6, 2020

(51) Int. Cl.
*E21B 43/26* (2006.01)
*C09K 8/592* (2006.01)
*E21B 41/00* (2006.01)
*E21B 43/24* (2006.01)

(52) U.S. Cl.
CPC .............. *E21B 43/26* (2013.01); *C09K 8/592* (2013.01); *E21B 41/0078* (2013.01); *E21B 43/24* (2013.01)

(58) Field of Classification Search
CPC ....................................................... E21B 43/26
See application file for complete search history.

(56) References Cited

U.S. PATENT DOCUMENTS

| | | | |
|---|---|---|---|
| 2,757,738 A | 9/1948 | Ritchey | |
| 2,795,279 A | 6/1957 | Erich | |
| 2,799,641 A | 7/1957 | Gordon | |
| 3,016,244 A | 1/1962 | Friedrich et al. | |
| 3,103,975 A | 9/1963 | Hanson | |
| 3,104,711 A | 9/1963 | Haagensen | |
| 3,114,875 A | 12/1963 | Haagensen | |
| 3,133,592 A | 5/1964 | Tomberlin | |
| 3,137,347 A | 6/1964 | Parker | |
| 3,149,672 A | 9/1964 | Joseph et al. | |
| 3,169,577 A | 2/1965 | Erich | |
| 3,170,519 A | 2/1965 | Haagensen | |

(Continued)

FOREIGN PATENT DOCUMENTS

| | | |
|---|---|---|
| CA | 2669721 | 7/2011 |
| CN | 101079591 | 11/2007 |

(Continued)

OTHER PUBLICATIONS

Caryotakis, The Klystron: A Microwave Source of Surprising Range and Endurance, 1997.*

(Continued)

*Primary Examiner* — William D Hutton, Jr.
*Assistant Examiner* — Avi T Skaist
(74) *Attorney, Agent, or Firm* — Fish & Richardson P.C.

(57) ABSTRACT

A downhole tool can be advanced downhole a wellbore. The downhole tool can include an electromagnetic source, a directional antenna, and a casing. The casing can either completely or partially consist of ceramic materials. The directional antenna can be oriented to direct electromagnetic radiation generated by the electromagnetic source towards the ceramic materials of the casing. In response to receiving the electromagnetic radiation, the ceramic materials can absorb the electromagnetic radiation, which can cause the ceramic materials to rapidly increase in temperature.

23 Claims, 6 Drawing Sheets

(56) References Cited

U.S. PATENT DOCUMENTS

| | | |
|---|---|---|
| 3,211,220 A | 10/1965 | Erich |
| 3,428,125 A | 2/1969 | Parker |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,696,866 A | 10/1972 | Dryden |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,373,581 A | 2/1983 | Toellner |
| 4,396,062 A | 8/1983 | Iskander |
| 4,412,585 A | 11/1983 | Bouck |
| 4,449,585 A | 5/1984 | Bridges et al. |
| 4,457,365 A | 7/1984 | Kasevich et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,705,108 A | 11/1987 | Little et al. |
| 4,817,711 A | 4/1989 | Jearnbey |
| 5,055,180 A | 10/1991 | Klaila |
| 5,068,819 A | 11/1991 | Misra et al. |
| 5,082,054 A | 1/1992 | Kiamanesh |
| 5,236,039 A | 8/1993 | Edelstein et al. |
| 5,899,274 A | 5/1999 | Frauenfeld et al. |
| 6,041,860 A | 3/2000 | Nazzal et al. |
| 6,189,611 B1 | 2/2001 | Kasevich |
| 6,413,399 B1 | 7/2002 | Kasevich |
| 6,544,411 B2 | 4/2003 | Varandaraj |
| 6,678,616 B1 | 1/2004 | Winkler et al. |
| 6,814,141 B2 | 11/2004 | Huh et al. |
| 7,048,051 B2 | 5/2006 | McQueen |
| 7,091,460 B2 | 8/2006 | Kinzer |
| 7,109,457 B2 | 9/2006 | Kinzer |
| 7,115,847 B2 | 10/2006 | Kinzer |
| 7,131,498 B2 * | 11/2006 | Campo ............... E21B 34/14 |
| | | 166/381 |
| 7,312,428 B2 | 12/2007 | Kinzer |
| 7,331,385 B2 | 2/2008 | Symington |
| 7,445,041 B2 | 11/2008 | O'Brien |
| 7,461,693 B2 | 12/2008 | Considine et al. |
| 7,484,561 B2 | 2/2009 | Bridges |
| 7,562,708 B2 | 7/2009 | Cogliandro et al. |
| 7,629,497 B2 | 12/2009 | Pringle |
| 7,631,691 B2 | 12/2009 | Symington et al. |
| 7,677,673 B2 | 3/2010 | Tranquilla et al. |
| 7,828,057 B2 | 11/2010 | Kearl et al. |
| 7,909,096 B2 * | 3/2011 | Clark ............... E21B 33/124 |
| | | 166/250.17 |
| 8,096,349 B2 | 1/2012 | Considine et al. |
| 8,210,256 B2 | 7/2012 | Bridges et al. |
| 8,526,171 B2 | 9/2013 | Wu et al. |
| 8,678,087 B2 | 3/2014 | Schultz et al. |
| 8,824,240 B2 | 9/2014 | Roberts et al. |
| 8,960,215 B2 | 2/2015 | Cui et al. |
| 9,217,291 B2 | 12/2015 | Batarseh |
| 9,567,819 B2 | 2/2017 | Cavender et al. |
| 9,765,609 B2 | 9/2017 | Chemali et al. |
| 10,330,915 B2 | 6/2019 | Rudolf et al. |
| 10,641,079 B2 | 5/2020 | Aljubran et al. |
| 10,941,644 B2 | 3/2021 | Aljubran et al. |
| 2003/0075339 A1 * | 4/2003 | Gano ............... E21B 43/105 |
| | | 166/380 |
| 2004/0256103 A1 | 12/2004 | Batarseh |
| 2005/0199386 A1 | 9/2005 | Kinzer |
| 2006/0076347 A1 | 4/2006 | Kinzer |
| 2006/0102625 A1 | 5/2006 | Kinzer |
| 2006/0106541 A1 | 5/2006 | Hassan et al. |
| 2007/0000662 A1 | 1/2007 | Symington et al. |
| 2007/0108202 A1 | 5/2007 | Kinzer |
| 2007/0131591 A1 | 6/2007 | Pringle |
| 2007/0137852 A1 | 6/2007 | Considine et al. |
| 2007/0137858 A1 | 6/2007 | Considine et al. |
| 2007/0153626 A1 | 7/2007 | Hayes et al. |
| 2007/0181301 A1 | 8/2007 | O'Brien |
| 2007/0187089 A1 | 8/2007 | Bridges |
| 2007/0193744 A1 | 8/2007 | Bridges |
| 2007/0204994 A1 | 9/2007 | Wimmersperg |
| 2007/0261844 A1 | 11/2007 | Cogliandro et al. |
| 2007/0289736 A1 | 12/2007 | Kearl et al. |
| 2008/0073079 A1 | 3/2008 | Tranquilla et al. |
| 2008/0173443 A1 | 7/2008 | Symington et al. |
| 2009/0209825 A1 | 8/2009 | Efinger et al. |
| 2009/0259446 A1 | 10/2009 | Zhang et al. |
| 2009/0288820 A1 | 11/2009 | Barron et al. |
| 2010/0186955 A1 * | 7/2010 | Saasen ............... C09K 8/422 |
| | | 166/288 |
| 2010/0326659 A1 | 12/2010 | Schultz et al. |
| 2011/0011576 A1 | 1/2011 | Cavender et al. |
| 2012/0012319 A1 | 1/2012 | Dennis |
| 2012/0075615 A1 | 3/2012 | Niclass et al. |
| 2012/0169841 A1 | 6/2012 | Chemali et al. |
| 2012/0181020 A1 | 7/2012 | Barron et al. |
| 2013/0008653 A1 | 1/2013 | Schultz et al. |
| 2013/0037268 A1 | 2/2013 | Kleefisch et al. |
| 2013/0126164 A1 | 5/2013 | Sweatman et al. |
| 2013/0191029 A1 | 7/2013 | Heck, Sr. |
| 2013/0213637 A1 | 8/2013 | Kearl |
| 2013/0255936 A1 | 10/2013 | Statoilydro et al. |
| 2014/0034144 A1 | 2/2014 | Cui et al. |
| 2014/0090846 A1 | 4/2014 | Deutch |
| 2014/0231147 A1 | 8/2014 | Bozso et al. |
| 2014/0278111 A1 | 9/2014 | Gerrie et al. |
| 2014/0360778 A1 | 12/2014 | Batarseh |
| 2016/0153240 A1 | 6/2016 | Braga et al. |
| 2016/0247316 A1 | 8/2016 | Whalley et al. |
| 2017/0234104 A1 | 8/2017 | James |
| 2018/0010109 A1 | 1/2018 | Livescu et al. |
| 2018/0266226 A1 * | 9/2018 | Batarseh ............... E21B 43/04 |
| 2021/0156243 A1 | 5/2021 | Aljubran et al. |

FOREIGN PATENT DOCUMENTS

| | | |
|---|---|---|
| CN | 102493813 | 6/2012 |
| CN | 102597419 | 7/2012 |
| CN | 104295448 | 1/2015 |
| CN | 204627586 | 9/2015 |
| CN | 105392954 | 3/2016 |
| CN | 107462222 | 12/2017 |

(56) References Cited

FOREIGN PATENT DOCUMENTS

| EP | 2317068 | 5/2011 |
|---|---|---|
| EP | 2737173 | 6/2014 |
| WO | WO2008146017 | 12/2008 |
| WO | WO2009020889 | 2/2009 |
| WO | WO2011038170 | 3/2011 |
| WO | WO2015095155 | 6/2015 |
| WO | WO2017011078 | 1/2017 |
| WO | WO2018169991 | 9/2018 |

OTHER PUBLICATIONS

GCC Examination Report in GCC Appln. No. GC 2019-37065, dated Mar. 16, 2020, 5 pages.
GCC Examination Report in GCC Appln. No. GC 2019-37064, dated May 5, 2020, 4 pages.
International Search Report and Written Opinion issued in International Application No. PCT/US2019/030171 dated Jul. 22, 2019, 14 pages.
International Search Report and Written Opinion issued in International Application No. PCT/US2019/017439 dated Jul. 1, 2019, 23 pages.
International Search Report and Written Opinion issued in International Application No. PCT/US2019/017441 dated Apr. 23, 2019, 17 pages.
Ruiter et al., "3D ultrasound computer tomography of the breast: A new era?" European Journal of Radiology 81S1, Sep. 2012, 2 pages.
Gemmeke and Ruiter, "3D ultrasound computer tomography for medical imagining," Nuclear Instruments and Methods in Physics Research A 580, Oct. 1, 2007, 9 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
Invitation to Pay Additional Fees and, Where Applicable, Protest Fee, issued in International Application No. PCT/US2019/017439 dated Apr. 18, 2019, 14 pages.
PCT International Search Report and Written Opinion issued in International Application No. PCT/US2020/015406 dated May 14, 2020, 13 pages.
GCC Examination Report in GCC Appln. No. GC 2019-37065, dated Jul. 11, 2020, 4 pages.
GCC Examination Report in GCC Appln. No. GC 2019-37064, dated Jan. 24, 2021, 5 pages.
GCC Examination Report in GCC Appln. No. GC 2019-37531, dated Nov. 10, 2020, 4 pages.
GCC Examination Report issued in GCC Appln. No. GC 2019-37065, dated Dec. 12, 2020, 4 pages.
GCC Examination Report issued in GCC Appln. No. GC 2020-39088, dated May 26, 2021, 5 pages.
CN Office Action issued in Chinese Appln. No. 201980027042.5, dated Jul. 5, 2021, 9 pages (with English Translation).

* cited by examiner

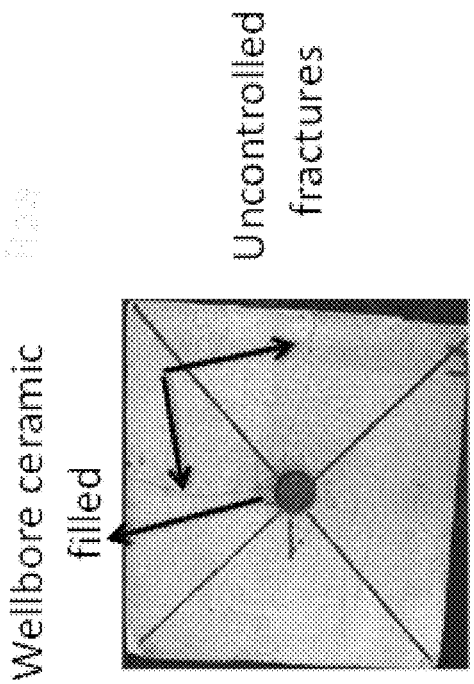
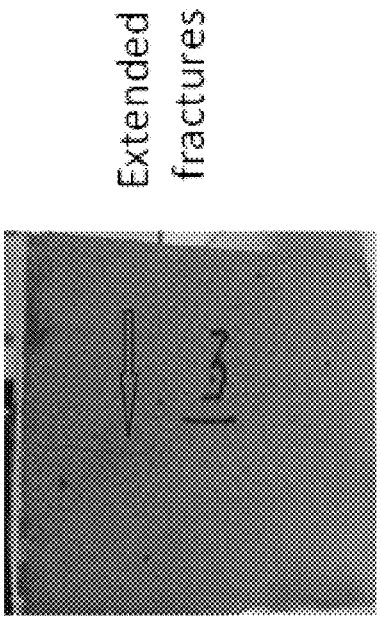
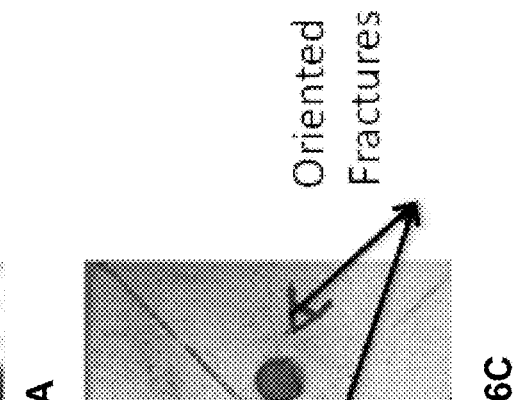
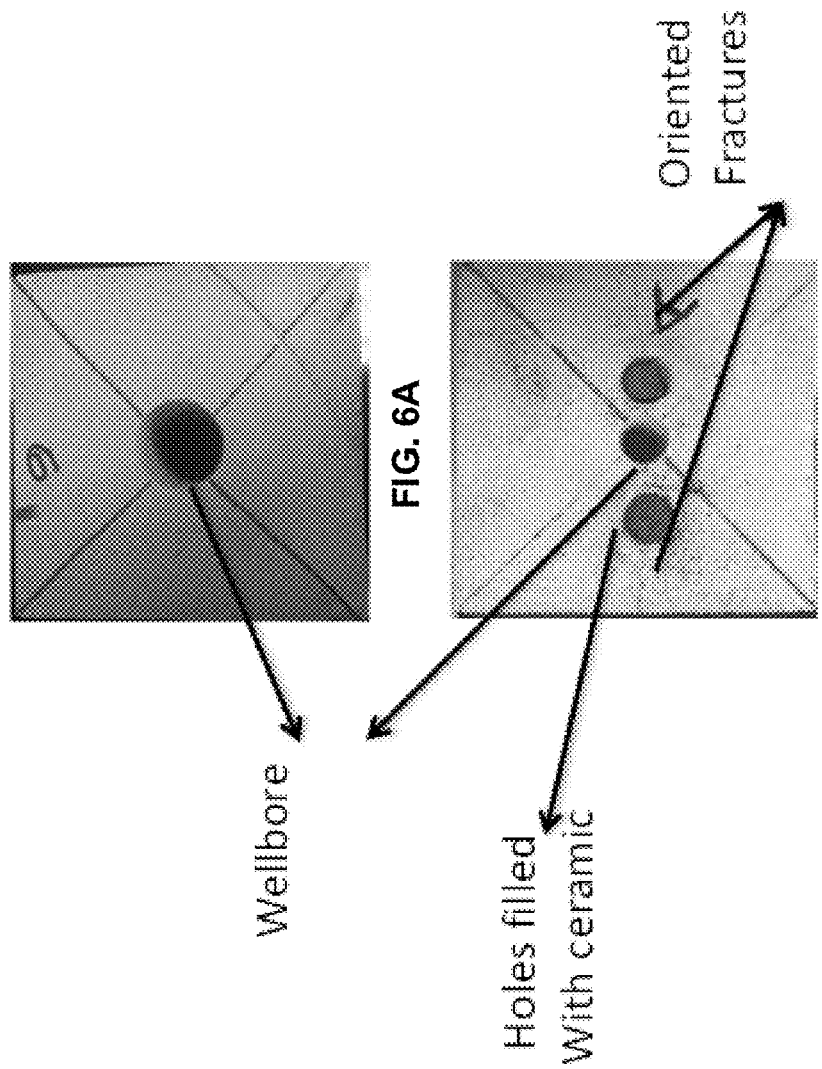
FIG. 6A
FIG. 6B
FIG. 6C
FIG. 6D

DOWNHOLE TOOLS FOR CONTROLLED FRACTURE INITIATION AND STIMULATION

TECHNICAL FIELD

This disclosure generally relates to tools for placement within a wellbore, in particular wellbore tools, for controlled fracture initiation and stimulation.

BACKGROUND

Fracturing is a well stimulation technique in which cracks are created in a subterranean formation to allow natural gas, petroleum, and brine to flow more freely. For example, hydraulic fracturing involves the high-pressure injection of 'fracking fluid' (primarily water containing sand or other proppants suspended with the aid of thickening agents) into a wellbore to create cracks in the deep-rock formations containing, for example, natural gas. When the hydraulic pressure is removed from the well, small grains of hydraulic fracturing proppants (either sand or aluminium oxide) hold the fractures open. Early fracturing techniques included using dynamite or nitroglycerin detonations to increase oil and natural gas production from petroleum bearing formations.

SUMMARY

Embodiments can provide one or more of the following advantages. Thermal shock induced by downhole tools can be used for fracture initiation and simulation. In some embodiments, a downhole tool includes an extendable casing, where at least a portion of the extendable casing includes ceramic material, and an antenna configured to transmit electromagnetic radiation towards the ceramic material. The tool can be placed downhole a wellbore. Once the tool is in a desired position, the expandable casing can be caused to expand such that the casing comes into direct contact with the walls of the wellbore. When the casing is in contact with the wellbore's walls, the antenna can be caused to transmit electromagnetic radiation towards the ceramic material of the casing. In response to receiving the electromagnetic radiation, the ceramic material rapidly increases in temperature. The rapid increase in temperature, along with the design of the casing and antenna, can lower the viscosity of the oil within the rock surrounding a wellbore, as well as create controlled fractures in the rock for improving communication and flow between the wellbore and formation. Furthermore, because the tool can control the orientation of rock fracturing, the flow of oil can be caused to bypass damaged zones of the wellbore. Thus, the downhole tool can increase the flow of oil into the wellbore while providing a means for controlling the flow of oil into the wellbore In at least one aspect of the present disclosure, a downhole tool is provided. The tool includes a support structure with a longitudinal axis and having a cylindrical shape, an expandable casing mechanically coupled to the support structure the expandable casing having a cylindrical shape and at least a portion of the expandable casing including a ceramic material, an electromagnetic source mechanically coupled to the support structure and operable to generate electromagnetic radiation, an antenna communicatively coupled to the electromagnetic source and operable to transmit the electromagnetic radiation, the antenna being disposed within the expandable casing and capable of steering the electromagnetic radiation in at least one direction, and a centralizer operable to centralize the downhole tool relative to the walls of a wellbore when the tool is positioned in the wellbore. The support structure includes one or more latching mechanisms. The electromagnetic radiation includes microwaves.

The ceramic materials can increase in temperature at a rate of 1000° Celsius/3 minutes in response to receiving the electromagnetic radiation. The ceramic materials can include at least one of: activated carbon or clay.

The tool can include one or more nozzles operable to release at least one of air or water.

The expandable casing can include steel. The expandable casing can include a hydraulic mechanism operable to expand the expandable casing. The expandable casing can be rotatable about the longitudinal axis of the support structure. Substantially the entirety of the expandable casing can include ceramic material.

The electromagnetic source can generate electromagnetic radiation having frequencies in the microwave region of the electromagnetic spectrum. The antenna can be mechanically rotatable about the longitudinal axis of the support structure. The antenna can be capable of electronically steering the electromagnetic radiation.

In at least one other aspect of the present disclosure, a downhole tool is provided. The tool includes a support structure with a longitudinal axis, an expandable casing mechanically coupled to the support structure and rotatable about the longitudinal axis of the support structure, at least a portion of the expandable casing includes a ceramic material. The tool includes an electromagnetic source mechanically coupled to the support structure and operable to generate electromagnetic radiation and an antenna communicatively coupled to the electromagnetic source and operable to transmit the electromagnetic radiation, the antenna being disposed with the expandable casing and capable of steering the electromagnetic radiation in at least one direction.

The support structure can include at least one latching mechanisms. The tool can include a centralizer operable to centralize the downhole tool when it is positioned in a wellbore. The tool can include a motor operable to rotate the casing. The tool can include one or more nozzles operable to release at least one of air or water.

The ceramic materials can increase in temperature at a rate of 1000° Celsius/3 minutes in response to receiving the electromagnetic radiation. The ceramic materials can include at least one of: activated carbon or clay. The expandable casing can include steel. The expandable casing can include a hydraulic mechanism operable to expand the expandable casing. The electromagnetic source can be a magnetron.

When compared to traditional hydraulic fracturing, where pressurized liquid (such as water containing sand or other proppants) is injected into a wellbore to create cracks in rock formations, the tools and methods described herein can increase control in the orientation of rock fractures. Furthermore, when compared to other oil flow improvement techniques, such as aiming electromagnetic radiation directly towards the rock formation to lower the viscosity of oil within the immediate vicinity of the wellbore, the tools and methods described herein can allow for reaching oil further away from the wellbore.

Several features are described that can each be used independently of one another or with any combination of other features. However, any individual feature may not provide any of the advantages discussed above or might only provide one of the advantages discussed previously These and other aspects, features, and implementations can be expressed as methods, apparatus, systems, components, means or steps for performing a function, and in other ways.

These and other aspects, features, and implementations will become apparent from the following descriptions, including the claims.

In the following description, for the purposes of explanation, numerous specific details are set forth in order to provide a thorough understanding of the systems and methods. It will be apparent, however, that the present systems and methods may be practiced without these specific details. In other instances, well-known structures and devices are shown in block diagram form in order to avoid unnecessarily obscuring other features.

Specific embodiments of these tools and methods are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

BRIEF DESCRIPTION OF THE DRAWINGS

FIG. 6A shows an example of a simulated wellbore that was drilled into a sandstone rock sample.

FIG. 6B shows an example of observed fractures in a rock sample after the ceramic material within a simulated wellbore was exposed to electromagnetic radiation for three minutes.

FIG. 6C shows an example of fractures caused by small holes filled with ceramic materials to simulate controlled fracture orientation.

FIG. 6D shows an example of a controlled fracture caused by the ceramic materials extending through a rock sample.

DETAILED DESCRIPTION

The present disclosure describes downhole tools that allow for generating controlled fractures in a rock formation while increasing the temperature of the oil within the rock formation to lower the viscosity of the oil. The downhole tool can be positioned in a wellbore and secured to the wellbore using latching mechanisms. In some implementations, the wellbore includes a wellbore casing and the downhole tool can be secured to the wellbore casing using a latching mechanism. The downhole tool includes a directional antenna (rotatable antenna and/or steerable beam antenna) that can rotate and transmit electromagnetic radiation generated by an electromagnetic source of the tool. The tool includes an expandable casing. The expandable casing can expand to contact the walls of the wellbore (or the wellbore casing) once the tool is in a desired position in the wellbore. The expandable casing is completely or partially formed of one or more ceramic materials. The directional antenna can transmit the electromagnetic radiation towards the ceramic materials. In response to receiving the electromagnetic radiation, the ceramic materials absorb the electromagnetic radiation and rapidly increase in temperature. The rapid increase in temperature can cause the surrounding rock formation to fracture due to thermal shock. The increase in temperature can also lower the viscosity of the oil within the surrounding rock formation. Consequently, the tool can increase oil flow into the wellbore while allowing for at least some control over the direction of oil flow.

Downhole Tool for Controlled Fracture Initiation and Stimulation

Figure 1:
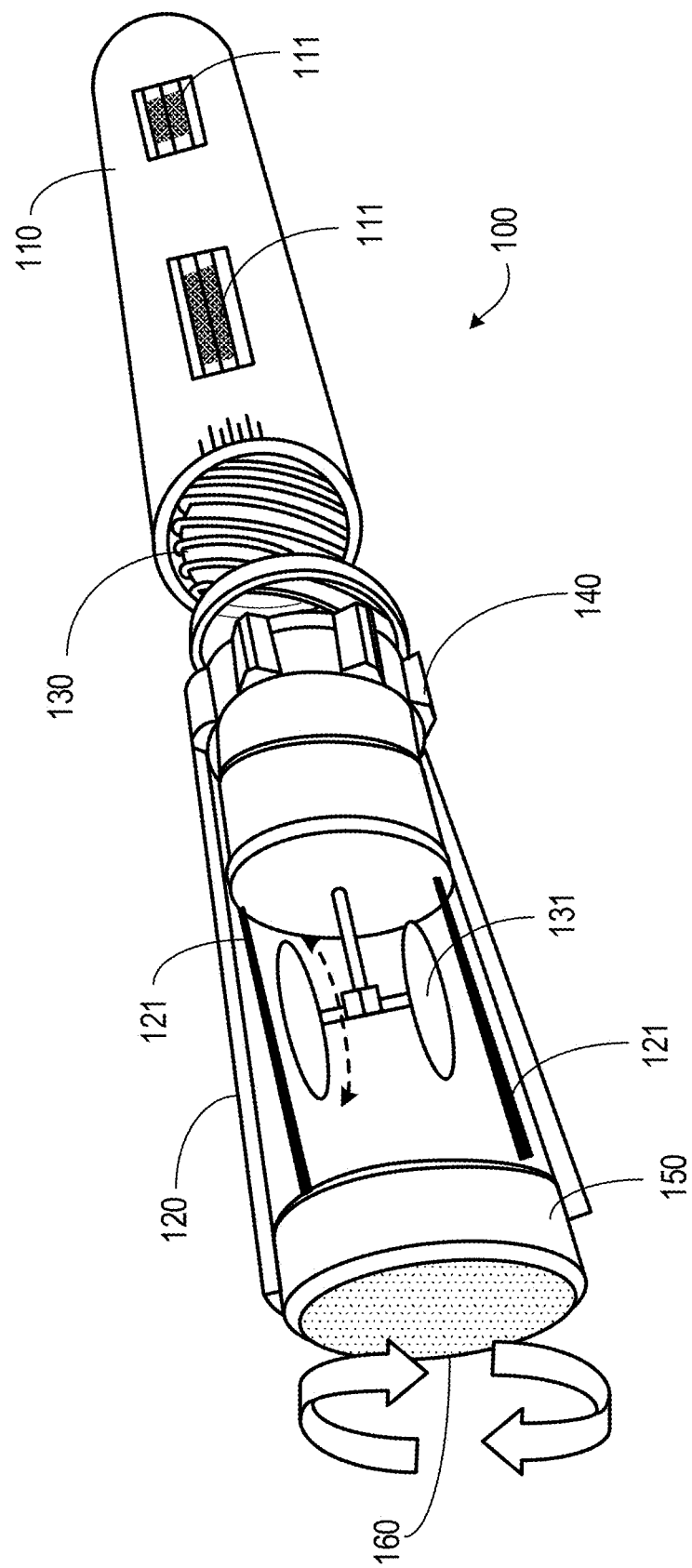
FIG. 1 is a perspective view of a downhole tool having a ceramic casing for controlled fracture orientation and stimulation.

FIG. 1 is perspective view of a downhole tool 100 having a ceramic casing for controlled fracture orientation and stimulation. The downhole tool 100 includes a support structure 110, a casing 120, an electromagnetic source 130, a directional antenna 131, a centralizer 140, a motor 150, and a reinforced plug 160. The support structure 110 includes latches 111.

The support structure 110 has a cylindrical shape having a longitudinal axis and is sized for placement within a wellbore. In some embodiments, the support structure 110 includes steel. Additionally, or alternatively, the support structure 110 can include other materials suitable for placement within a wellbore. In some embodiments, the support structure 110 includes vulcanized rubber (such as Ebonite), super alloys, titanium, aluminum, acrylonitrile butadiene styrene (ABS), polycarbonates, polyamides, and so forth. The latches 111 are mechanical fasteners capable of joining two (or more) surfaces while allowing for their separation. For example, the latches 111 can press against the walls of a wellbore with enough force such that the tool 100 is secured in place within the wellbore. As another example, the latches 111 can be paired with receivers inside a wellbore to secure the downhole tool 100 in place within the wellbore The electromagnetic source 130 is mechanically coupled to the support structure 110. The electromagnetic source 130 is operable to generate electromagnetic radiation. In the downhole tool 100, the electromagnetic source is at least partially enclosed within the support structure 110. The electromagnetic source 130 includes a magnetron. A magnetron is a vacuum tube capable of generating microwaves using the interaction of a stream of electrons with a magnetic field while moving past a series of open metal cavities known as cavity resonators. The frequency of the microwaves produced can be determined by the magnetron's physical dimensions. In some embodiments, the electromagnetic source 130 includes a klystron, which is a thermo-ionic electron tube that can generate microwaves and/or radio waves by controlling the speed of a stream of electrons into a cavity resonator. The electromagnetic source 130 can include other devices capable of generating microwave radiation such as, for example, traveling-wave tubes (TWT), gyrotrons, field-effect transistors, tunnel diodes, Gunn diodes, IMPATT diodes, and masers. In some embodiments, the electromagnetic source 130 includes an electronic oscillator capable of generating radio waves. In these embodiments, the electromagnetic source 130 can generate electromagnetic radiation having frequencies in the microwave range (300 gigahertz (GHz)-300 megahertz (MHz)) and/or frequencies in the radio range (300 GHz-3 kilohertz (kHz)).

In some embodiments, the electromagnetic source 130 is not enclosed within the support structure 110.

The directional antenna 131 is communicatively coupled to the electromagnetic source 130. The directional antenna 131 has a length of about 5 centimeters (cm). In some embodiments, the directional antenna 131 has a length between 1 cm and 20 cm. However, in some embodiments, the directional antenna 131 is manufactured to be longer than 20 cm or shorter than 1 cm. The length can be based on design and practical considerations. For example, the size of the casing 120 can dictate the length of the antenna.

The directional antenna 131 is operable to transmit electromagnetic radiation in the microwave and/or radio wave frequencies. The directional antenna 131 is a rubber duck antenna. However, some tools 100 have other types of antennas. For example, in some embodiments, the directional antenna 131 is a sleeve dipole, a patch antenna, a whip antenna, or a printed circuit inverted F antenna (PIFA). In some embodiments, the directional antenna 131 is a directive antenna. For example, the directional antenna 131 can be a dish antenna, a horn antenna, a slot antenna, a dielectric lens antenna, and/or a flat microstrip antenna. The directional antenna 131 is a mechanically steerable beam antenna. A mechanically steerable antenna is an antenna that uses actuators and rotatable structures such as gimbals to change the physical orientation of the antenna and steer the output beam of the antenna. Additionally, or alternatively, the directional antenna 131 is an electronically steerable antenna, such as a phased array antenna or switched-beam array antenna. In some embodiments, the directional antenna 131 is an omnidirectional antenna.

The centralizer 140 is mechanically coupled to the support structure 110 and the casing 120. The centralizer 140 operates to maintain the downhole tool 100 in a central location with respect to the walls of the wellbore when the downhole tool 100 is located within the wellbore and advanced into the wellbore. In some embodiments, the centralizer 140 includes bowstrings, spring-loaded linkages, and/or floating spring mechanisms to maintain the downhole tool 100 in a centralized position within the wellbore. In some embodiments, the centralizer 140 includes an actuator to expand the centralizer from an unactuated position to an actuated position. In some embodiments, the centralizer 140 includes sensors to detect the orientation of the downhole tool 100 in the wellbore. In some embodiments, the centralizer 140 is actuated in response to the detected orientation of the downhole tool 100.

The casing 120 is cylindrical in shape and includes one or more ceramic materials. The casing 120 is sized to allow movement of the downhole tool 100 in a wellbore. The casing 120 is mechanically coupled to the support structure 110. The casing 120 is configured to be rotatable about the longitudinal axis of the support structure 110. However, in some embodiments, the casing 120 is fixed statically to the support structure 110. The casing 120 at least partially encloses the directional antenna 131. In some embodiments the casing 120 encloses more or less of the electromagnetic source 130 than the support structure 110. The casing 120 is completely made of one or more ceramic materials. However, as discussed later with reference to FIG. 2, in some tools, the casing 120 is only partially made of one or more ceramic materials. A ceramic material is a solid material comprising an inorganic compound of metal, non-metal, or metalloid atoms primarily held in ionic and/or covalent bonds. The ceramic materials can be one of several materials that can absorb electromagnetic radiation. In some embodiments, the ceramic materials include activated carbon. In some embodiments, the ceramic materials include clay. The clay can be hardened by heat.

The casing 120 is expandable. The casing 120 includes one or more hydraulic mechanisms, such as hydraulic pumps, that cause the casing 120 to expand. Additionally, or alternatively, the casing 120 includes one or more mechanical mechanisms, such as expansion shafts and/or expansion anchors, which cause the casing 120 to expand. Manufacturing the casing 120 to include expansion capabilities can allow for easier advancement of the downhole tool 100 through a wellbore, while allowing the casing 120 to directly contact the walls of the wellbore once the downhole tool 100 is in a desired position within the wellbore. For example, the downhole tool 100, including the casing 120, can be advanced downhole a wellbore with the casing 120 in a compressed position such that the casing 120 is not contacting the walls of the wellbore. This configuration can reduce the likelihood of causing an undesirable amount of friction (for example, an amount of friction that would cause damage to the wellbore and the casing 120, and/or an amount of friction that would make it difficult to advance the downhole tool 100 through the wellbore). Once the downhole tool 100 is located in a desired position within the wellbore, the expansion mechanisms of the casing 120 can be actuated to cause the casing 120 to contact the walls of the wellbore.

As indicated earlier, the directional antenna 131 can be operated to direct transmission of electromagnetic radiation. In embodiments where the casing 120 completely consist of ceramic materials, such as the embodiment shown in FIG. 1, the directional antenna 131 can be oriented (for example, by mechanically steering and/or electronically steering) to direct transmission of electromagnetic radiation towards specific portions of the casing 120 to create heating zones 121. As explained later with reference to FIG. 2, when only portions of the casing 120 include ceramic materials, the directional antenna 131 can be oriented to direct transmission of electromagnetic radiation towards one or more portions of the casing 120 that include ceramic materials. Upon receiving the electromagnetic radiation transmitted from the directional antenna 131 (for example, at the heating zones 121), the ceramic materials absorb the electromagnetic radiation, causing the ceramic materials to increase in temperature at a rapid rate. For example, when the directional antenna 131 transmits microwaves having a frequency ranging between 300 MHz to 245 GHz, the ceramic materials can increase in temperature at rates of up to 1000° Celsius/3 minutes. Because the casing 120 is in contact with the walls of the wellbore when the downhole tool 100 is in use, the heat generated by the increase in temperature is transferred to the walls, and in turn, transferred to the surrounding rock formations. The rapid increase in temperature can cause the surrounding rock formations to fracture, increasing the flow of oil into the wellbore. The increase in temperature can also lower the viscosity of oil within the surrounding rock formations to increase flow of oil into the wellbore.

The motor 150 is mechanically coupled to the casing 120. The motor 150 is operable to rotate the casing 120 about the longitudinal axis of the support structure 110. The motor 150 is positioned at a distal end of the casing 120 with respect to the electromagnetic source 150. However, in some embodiments, the motor 150 is positioned at other locations of the casing 120, such as the proximal end of the casing 120 with respect to the electromagnetic source 150. In some embodiments, the motor 150 is at least partially enclosed within the casing 120. However, in some embodiments, the motor 150 is completely external to the casing 120. Rotation of the casing 120 by the motor 150 can facilitate more control of the orientation of the heating zones 121.

The reinforced plug 161 includes steel. Additionally, or alternatively, the reinforced plug 161 can include other materials suitable for placement within a wellbore. In some embodiments, the reinforced plug 161 includes vulcanized rubber (such as Ebonite), super alloys, titanium, aluminum, acrylonitrile butadiene styrene (ABS), polycarbonates, polyamides, and so forth. The reinforced plug 161 is sized and shaped to be secured at an end of the casing 120. In some embodiments, the reinforced plug 161 is size and shaped such that mechanical forces keep the reinforced plug 161 within the casing 120 and the reinforced plug 161 provides a sealing effect at an end of the casing 120. However, in some embodiments, the reinforced plug remains external to the casing 120 and is fixed to the end of the casing 120 by using, for example, one or more latching mechanisms. The reinforced plug can act to prevent damage to an end of the casing 120 and contain the electromagnetic radiation (and heat) within the casing 120.

Figure 2:
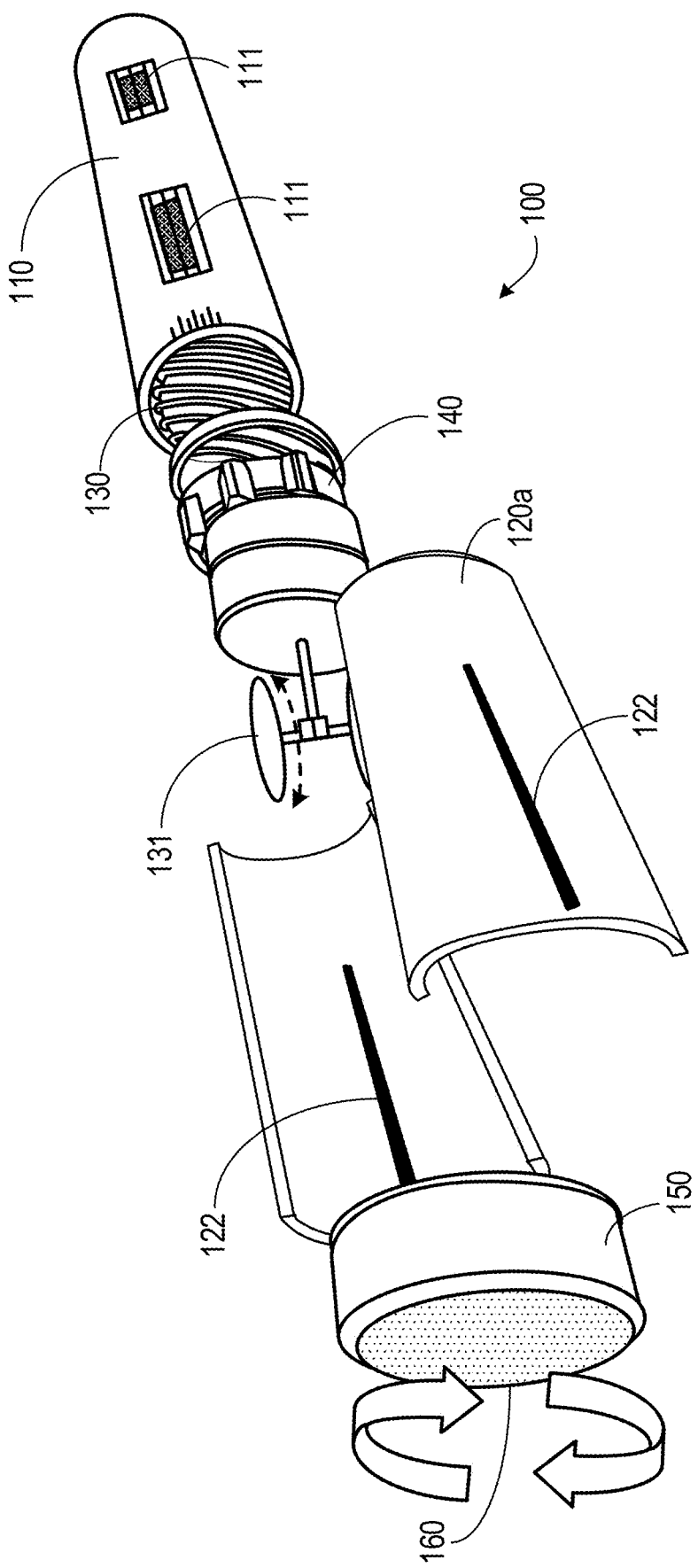
FIG. 2 is a partially exploded perspective view of a downhole tool having a casing with ceramic strips for controlled fracture orientation and stimulation.

FIG. 2 is an exploded perspective view of a downhole tool 100 having a casing 120*a* with one or more ceramic strips 122 for controlled fracture orientation and stimulation. The downhole tool 100 of FIG. 2 is substantially similar to the downhole tool 100 shown in FIG. 1. However, the casing 120*a* shown in FIG. 2 includes one or more ceramic strips 122 instead of being completely made of one or more ceramic materials.

The casing 120*a* is cylindrical in shape and is sized to allow movement of the downhole tool 100 in a wellbore. The casing 120*a* is mechanically coupled to the support structure 110. The casing 120*a* is configured to be rotatable about the longitudinal axis of the support structure 110. However, in some embodiments, the casing 120*a* is fixed statically to the support structure 110. The casing 120*a* at least partially encloses the antenna 131. In some embodiments, the casing 120*a* encloses at least a portion of the electromagnetic source 130. The casing 120*a* includes one or more ceramic strips 122. Each of the one or more ceramic strips 122 include one or more ceramic materials. The ceramic materials can be one of several materials that can absorb electromagnetic radiation. In some embodiments, the ceramic materials include activated carbon. In some embodiments, the ceramic materials include clay. The portions of the casing 120*a* other than the ceramic strips 122 include steel. Additionally, or alternatively, these portions include other materials suitable for wellbore operations such as, for example, vulcanized rubber (such as Ebonite), super alloys, titanium, aluminum, acrylonitrile butadiene styrene (ABS), polycarbonates, and polyamides.

The casing 120*a* is expandable. The casing 120*a* includes one or more hydraulic mechanisms, such as hydraulic pumps, that cause the casing 120*a* to expand. Additionally, or alternatively, the casing 120*a* includes one or more mechanical mechanisms, such as expansion shafts and/or expansion anchors, which cause the casing 120*a* to expand.

Example Method of Use

Figure 3:
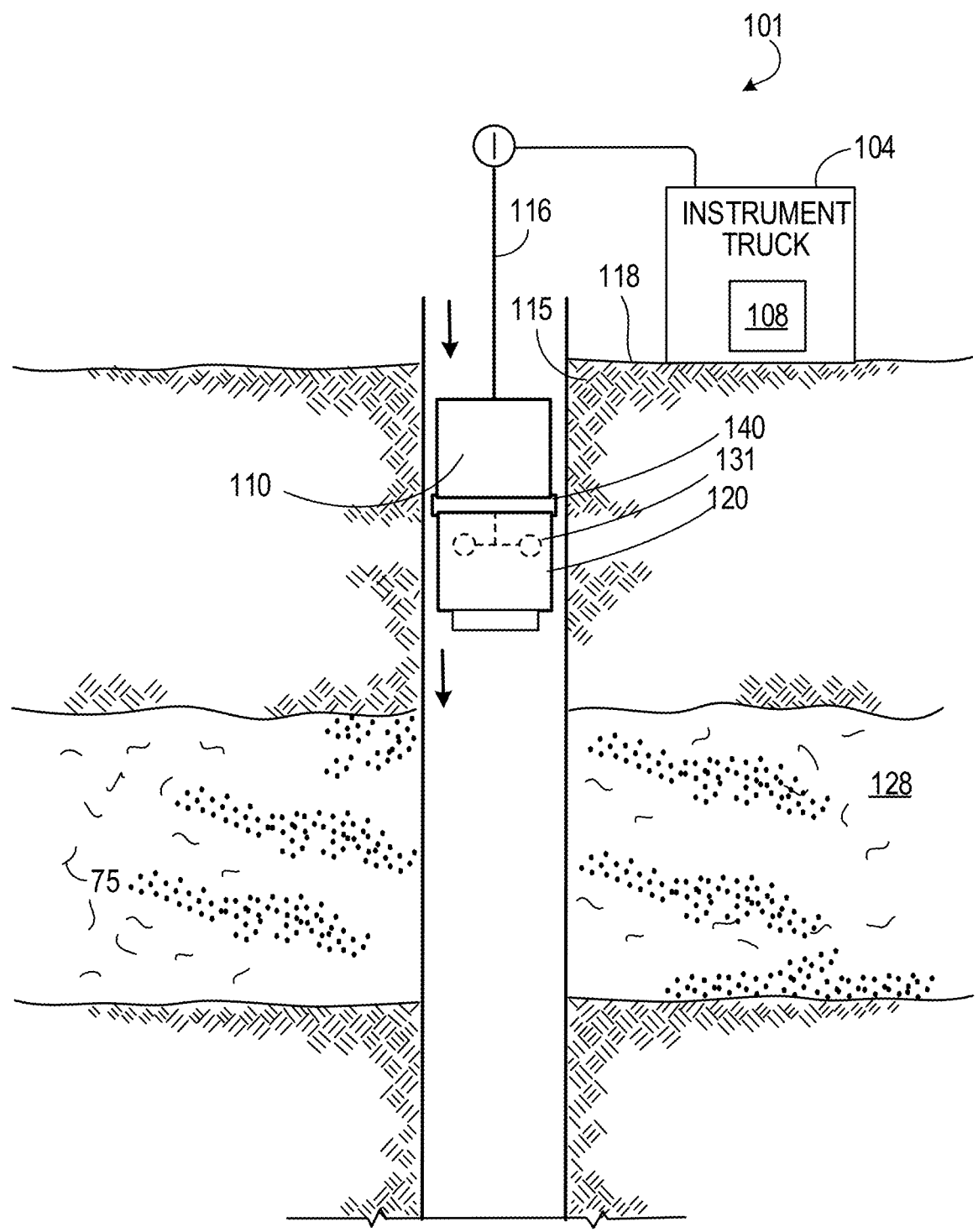
FIG. 3 shows a downhole tool traversing downhole a wellbore.

An example method of using the downhole tool 100 will now be described. FIG. 3 shows a downhole tool 100 traversing downhole a wellbore 115. The downhole tool 100 is the downhole tool 100 shown in FIGS. 1-2, and therefore includes the support structure 110, the expandable casing 120 (or the expandable casing 120*a*), the electromagnetic source 130, the directional antenna 131, the centralizer 140, the motor 150, and the reinforced plug 160 as discussed earlier with reference to FIGS. 1-2. The support structure 110 includes the latches 111.

The downhole tool 100 is coupled to a cable 116, which is operated by the instrument truck 104. The cable 116 can be replaced, for example, by a rope, belt, or chain. In some implementations, the downhole tool 100 is coupled to a drill string, which refers to a column of drill pipe that transmits drilling fluid and torque to a drill bit. The instrument truck 104 includes a fracture control system 108, which is operable to control the cable 116. The fracture control system 108 is also operable to control the motor 150, the latches 111, the expandable casing 120, the electromagnetic source 130, and the directional antenna 131. The fracture control system 108 controls the drive mechanism 116 to move the downhole tool 100 downhole (and/or uphole) the wellbore 115. While traversing downhole the wellbore 115, the expandable casing 120 is not expanded, and the latches 111 are not extending, which can allow the downhole tool 100 to move downhole the wellbore 115 without unnecessary obstruction. The centralizer 140 allows the downhole tool 100 to maintain a central location within the wellbore 115 as the downhole tool 100 moves within the wellbore 115.

Figure 4:
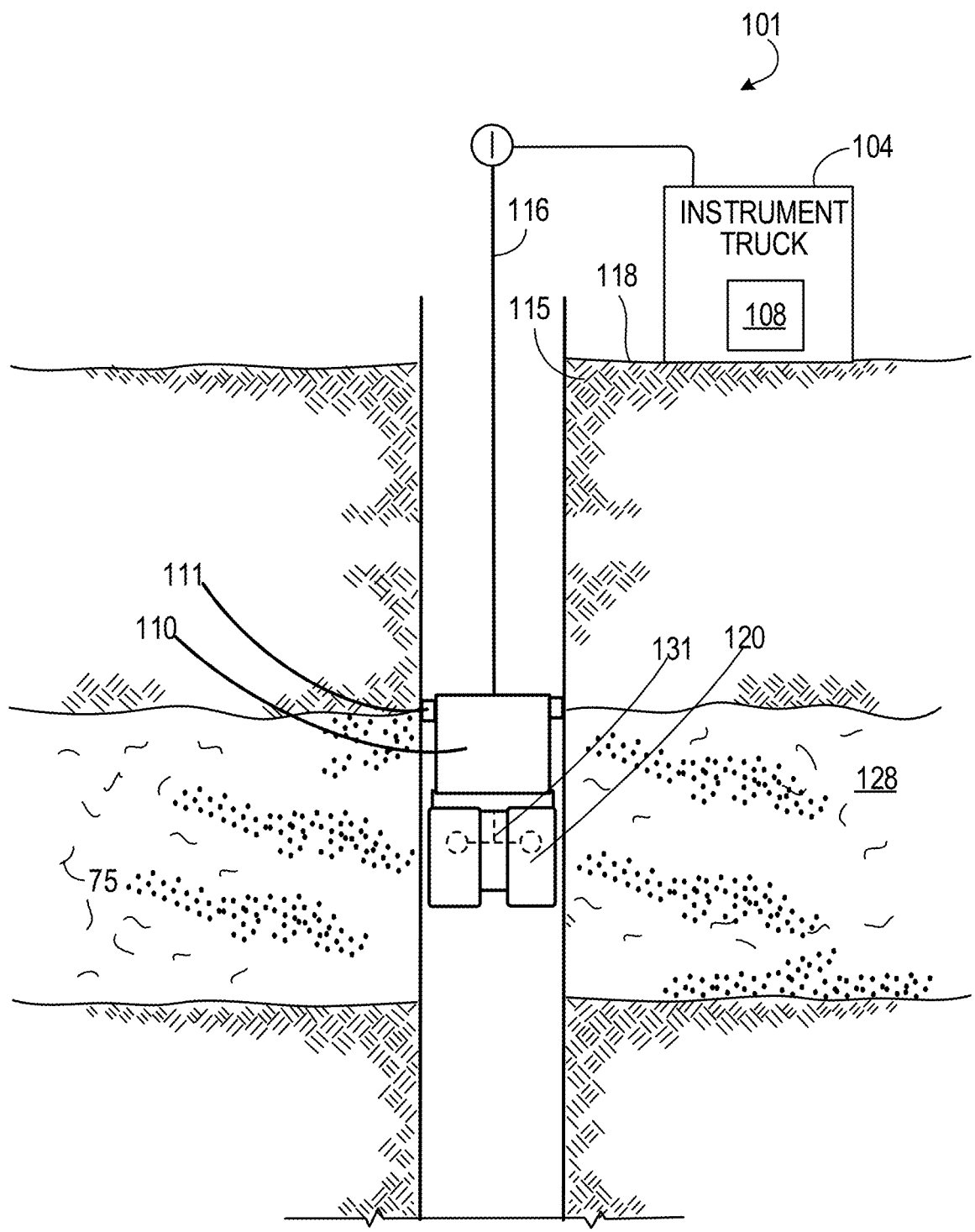
FIG. 4 shows a downhole tool in a desired position for fracture initiation and stimulation.

FIG. 4 shows a downhole tool 100 in a desired position for fracture initiation and stimulation. Once the downhole tool 100 is in a desired position, the fracture control system 108 actuates the latches 111 of the downhole tool 100, such that the latches 111 extend and apply a force to the walls of the wellbore 115. The force applied is sufficient to keep the downhole tool 100 in the desired position during fracturing operations. The fracture control system 108 rotates the expandable casing 120 to and steers the directional antenna 131 to desired positions (e.g., to cause a desired fracture orientation in the rock formation). Once the expandable casing 120 is in a desired position, the fracture control system 108 further actuates an expansion mechanism of the expandable casing 120 to cause the expandable casing 120 to expand and contact the walls of the wellbore 115.

Figure 5:
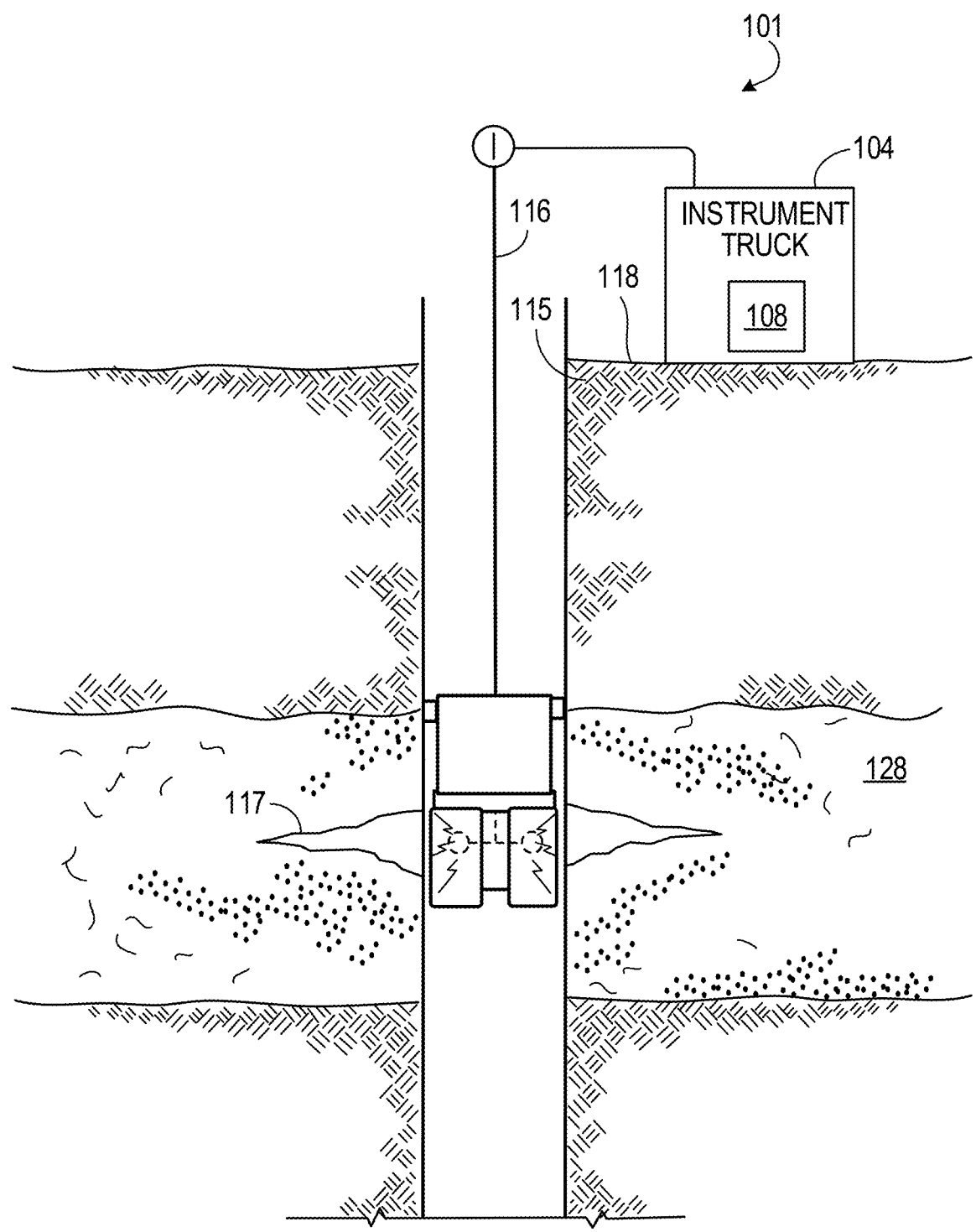
FIG. 5 shows a downhole tool 100 performing fracture initiation and stimulation within a wellbore.

FIG. 5 shows a downhole tool 100 performing fracture initiation and stimulation within a wellbore. Once the downhole tool 100 is secured in place by the latches 111, and the expandable casing 120 is expanding to contact the walls of the wellbore 115, the fracture control system 108 operates the electromagnetic source 130 such that the electromagnetic source 130 generates electromagnetic radiation. As previously discussed with reference to FIG. 1, the directional antenna 131 is capable of transmitting the electromagnetic radiation generated by the electromagnetic source 130. The fracture control system 108 operates the directional antenna 131 to steer the direction of the transmitted electromagnetic radiation to a desired location on the ceramic materials of the expandable casing 120 (such as the heating zones of 121 or the ceramic strips 122 as discussed with reference to FIG. 1 and FIG. 2, respectively). In response to receiving the electromagnetic radiation, the temperature of the ceramic materials of the expandable casing 120 increases rapidly, causing fractures 117 in the subterranean formation 128. The heating and fracturing allows oil from the subterranean formation 128 to flow into the wellbore 115 from the fractures 117. The incoming oil can be brought to the surface 118 proximate to the opening of the wellbore 115.

Experimental Results

A simulated wellbore was drilled into 5×5 feet sandstone and limestone rock samples. FIG. 6A shows an example of a simulated wellbore that was drilled into a sandstone rock sample. The simulated wellbore was filled completely with ceramic materials. The ceramic materials were exposed to microwave radiation at 2.45 GHz for three minutes. After three minutes of microwave exposure, fractures in the rock samples were observed. FIG. 6B shows an example of observed fractures in a rock sample after the ceramic material within a simulated wellbore was exposed to electromagnetic radiation for three minutes. As shown, the fractures propagated from the location of the simulated wellbore at a 90 degree angle. To simulate controlled fracture orientation, small holes were drilled proximate to the simulated wellbore and filled with ceramic materials. The ceramic materials within the small holes were exposed to microwave radiation for three minutes. FIG. 6C shows an example of fractures caused by small holes filled with ceramic materials to simulate controlled fracture orientation. As shown, the direction of the fractures caused by the ceramic in the small holes exhibited a controlled orientation. FIG. 6D shows an example of a controlled fracture caused by the ceramic materials extending through a rock sample. For each experiment, infrared images of the rock samples were captured after the ceramic material was exposed to the microwave radiation for three minutes. In some instances, the temperature of the ceramic materials increased from 20 degrees Celsius to 331.2 degrees Celsius.

Other Embodiments

While certain embodiments have been described above, other embodiments are possible.

In some embodiments, the downhole tool 100 further includes one or more control modules (not shown). A control module operates in accordance with a controller which includes, for example, one or more processors (e.g., one or more computer processors such as microprocessors or microcontrollers or both), short-term and/or long-term data storage (e.g., memory random-access memory or flash memory or both), ROM, and instructions stored in memory that carry out operations of the controller when the instructions are executed (e.g., by the one or more processors). In some embodiments, the control module operates at least one function of one or more components of the downhole tool 100. For example, the control module can operate the electromagnetic source 130, the directional antenna 121, and the motor 150.

In some embodiments, the downhole tool 100 includes one or more nozzles (not shown) that operate to release pressurized air and/or water. The one or more nozzles can facilitate cleaning, purging and controlling of the materials released from the rock formation as the rock formation is fractured during use of the downhole tool 100.

While the support structure 110 is described as having a cylindrical shape, in some embodiments, the support structure 110 has other shapes. In some embodiments, the support structure 110 has a cubical shape. In some embodiments, the support structure 110 has a conical shape. In some embodiments, the support structure 110 has a spherical shape. The support structure 110 can have, for example, a toroidal shape, a cuboidal shape, a pyramidal shape, and a triangular shape (such as a prism). While the support structure 110 is described as being sized for placement within a wellbore, in some embodiments, the support structure 110 is sized such that it can be placed and rested on top of the entrance to a wellbore. For example, the support structure 110 can be larger than the expandable casing 120 such that the expandable casing 120 can be advanced into a wellbore until the support structure 110 abuts the edges of the entrance to the wellbore.

While the ceramic strips 122 are shown as having a horizontal linear shape, in some embodiments, the ceramic strips 122 can have other shapes. For example, the ceramic strips 122 can have circular shapes, vertical linear shapes, curved shapes, and so forth. While two ceramic strips 122 are shown FIG. 2, the casing 120a can include one ceramic strip 122 or more than two ceramic strips 122.

In the foregoing description, tools and methods have been described with reference to numerous specific details that may vary from implementation to implementation. The description and drawings are, accordingly, to be regarded in an illustrative rather than a restrictive sense. Any definitions expressly set forth herein for terms contained in such claims shall govern the meaning of such terms as used in the claims.

What is claimed is:

1. A downhole tool, comprising:
   a support structure with a longitudinal axis and having a cylindrical shape, the support structure comprising one or more latching mechanisms;
   an expandable casing mechanically coupled to the support structure and rotatable about the longitudinal axis of the support structure, the expandable casing having a cylindrical shape and at least a portion of the expandable casing comprising a ceramic material;
   an electromagnetic source mechanically coupled to the support structure and operable to generate electromagnetic radiation;
   an antenna communicatively coupled to the electromagnetic source and operable to transmit the electromagnetic radiation, the antenna being a mechanically steerable antenna that is rotatable relative to the expandable casing and capable of steering the electromagnetic radiation in at least one direction; and
   a centralizer operable to centralize the downhole tool relative to walls of a wellbore when the tool is positioned in the wellbore;
   wherein the expandable casing is configured to expand such that the expandable casing comes into direct contact with the walls of the wellbore when the tool is positioned in the wellbore.

2. The downhole tool of claim 1, wherein the ceramic materials increase in temperature at a rate of 1000° Celsius/3 minutes in response to receiving the electromagnetic radiation.

3. The downhole tool of claim 1, wherein the ceramic materials comprise at least one of: activated carbon or clay.

4. The downhole tool of claim 1, wherein the tool further comprises one or more nozzles operable to release at least one of air or water.

5. The downhole tool of claim 1, wherein the expandable casing further comprises steel.

6. The downhole tool of claim 1, wherein the expandable casing further comprises a hydraulic mechanism operable to expand the expandable casing.

7. The downhole tool of claim 1, wherein the electromagnetic source generates electromagnetic radiation having frequencies in a microwave region of the electromagnetic spectrum.

8. The downhole tool of claim 1, wherein the expandable casing comprises one or more mechanical mechanisms, corresponding to an expansion shaft or an expansion anchor, that are operable to expand the expandable casing.

9. The downhole tool of claim 1, wherein substantially the entirety of the expandable casing comprises ceramic material.

10. The downhole tool of claim 1, wherein the antenna:
    is an omnidirectional antenna;
    is mechanically rotatable about the longitudinal axis of the support structure; and
    comprises rotatable structures to change a physical orientation of the antenna and steer an output beam of the antenna.

11. The downhole tool of claim 1, wherein the antenna is capable of electronically steering the electromagnetic radiation.

12. A downhole tool, comprising:
a support structure with a longitudinal axis;
an expandable casing mechanically coupled to the support structure and rotatable about the longitudinal axis of the support structure, at least a portion of the expandable casing comprising a ceramic material;
an electromagnetic source mechanically coupled to the support structure and operable to generate electromagnetic radiation, the electromagnetic radiation comprising microwaves; and
an antenna communicatively coupled to the electromagnetic source and operable to transmit the electromagnetic radiation, the antenna being a mechanically steerable antenna that is rotatable relative to the expandable casing and capable of steering the electromagnetic radiation in at least one direction;
wherein the expandable casing is configured to expand such that the expandable casing comes into direct contact with walls of a wellbore when the tool is positioned in the wellbore.

13. The downhole tool of claim 12, wherein the support structure includes latching mechanisms.

14. The downhole tool of claim 12, further comprising a centralizer operable to centralize the downhole tool relative to the walls of the wellbore when the downhole tool is positioned in the wellbore.

15. The downhole tool of claim 12, further comprising a motor operable to rotate the casing.

16. The downhole tool of claim 12, wherein the ceramic materials increase in temperature at a rate of 1000° Celsius/3 minutes in response to receiving the electromagnetic radiation.

17. The downhole tool of claim 12, wherein the ceramic materials comprise at least one of: activated carbon or clay.

18. The downhole tool of claim 12, wherein the electromagnetic source comprises a thermo-ionic electron tube that controls a speed of a stream of electrons to generate the electromagnetic radiation.

19. The downhole tool of claim 12, wherein the electromagnetic radiation comprises radio waves.

20. The downhole tool of claim 12, wherein the tool further comprises one or more nozzles operable to release at least one of air or water.

21. The downhole tool of claim 12, wherein the expandable casing further comprises steel.

22. The downhole tool of claim 12, wherein the expandable casing further comprises a hydraulic mechanism operable to expand the expandable casing.

23. The downhole tool of claim 12, wherein the electromagnetic source is a magnetron.

\* \* \* \* \*